July 16, 1963 J. J. J. STAUNTON 3,097,928
ULTRA-MICRO CUVETTE ASSEMBLY
Filed Nov. 7, 1960

INVENTOR:
John J. J. Staunton,
BY
Bair, Freeman & Molinare
ATTORNEYS.

United States Patent Office 3,097,928
Patented July 16, 1963

3,097,928
ULTRA-MICRO CUVETTE ASSEMBLY
John J. J. Staunton, Oak Park, Ill., assignor to Coleman Instruments, Inc., Maywood, Ill., a corporation of Delaware
Filed Nov. 7, 1960, Ser. No. 67,664
10 Claims. (Cl. 23—292)

This invention relates to an ultra-micro cuvette assembly for use in spectrophotometers, colorimeters and the like. In particular, the invention is directed to an ultra-micro cuvette which furnishes significant improvements in optical accuracy and operational convenience.

In spectrophotometric measurement, it is necessary to interpose between the monochromator, or source of monochromatic light, and the photometer a cuvette or transparent vessel. The vessel contains the sample solution or a reference solution like the sample but devoid of the colored constituent being measured. The colored constituent absorbs light from the optical beam to an extent which is a function of the amount or concentration of the colored constituent, and of the thickness or optical depth of the cuvette. When an ample amount of sample is available, its concentration in the cuvette can be preadjusted to fall into a range which furnishes satisfactory measurement accuracy, i.e., a range where the percent transmittance of the solution is between 10 and 90. If the amount of sample is small, it may become a problem to find a cuvette small enough to function with the limited volume available and yet of sufficient optical depth to furnish transmittance readings in the optimum range.

In recent years, a demand for measurement with very small amounts of sample has arisen which imposes serious limitations on the practical dimensions of the cuvette. It is now necessary to run determinations with a sample volume on the order of 0.1 milliliter. An ultramicro cuvette having a very small volume is necessary. Previously, the small volume requirement has been met by making the cuvette narrower while preserving the greatest practical optical depth, i.e., length parallel to the optical beam. To reduce the optical depth or to reduce the concentration by greater dilution will, in either case, be unavailing as a means of measuring smaller amounts of sample: either reduction will decrease the absorption of light from the beam and reduce the sensitivity of the measurement. Hence, the practical method is to reduce only the width and height of the sample volume in the cuvette. This is accomplished by placing a mask having a narrow rectangular aperture before the cuvette, so as to limit the cross-section of the beam passing through the cuvette. A cuvette is used which has internal dimensions substantially those of the beam. Such a cuvette may be less than 2 mm. wide, have a depth of fill of about 5 mm. for reliable measurement, and have a length as near 1 cm. as practical.

Filling and emptying such a small volume presents considerable difficulty. Surface tension is an important factor, causing the entrainment of air bubbles during filling, and the retention of liquid during emptying, especially in the corners. Consequently, ultra-micro cuvettes were not used extensively until a practical method of filling and emptying was devised. Accompanying this difficulty was the great liability to incur optical error due to inaccurate positioning of the cuvette when the cuvette was removed for filling or emptying and then replaced for measurement.

One solution which has been proposed is to fix the cuvette in the instrument, fill with a slender pipette inserted to the bottom to avoid bubble entrainment, drain the cuvette by sucking the sample out through a hole in the bottom, make the cuvette with curved walls and free from corners and use a detergent in the wash water to wet and drain the walls evenly and thoroughly. However, the cuvette must be specially constructed and permanently mounted, drain connections must be provided and leaks avoided, and the inactive volume which must be filled by the sample is significantly increased by the construction.

The present invention has for an object the provision of an ultra-micro cuvette which overcomes these and other prior disadvantages, and improves the accuracy and convenience of the cuvette in spectrophotometers and the like, in the measurement of very small volumes.

Another object is to provide a cuvette assembly and method of operation which employ the preferred and more basic flat-bottomed cuvette, and particularly, a plane-parallel sided cuvette of precision optical depth, which is preferably about 1 cm., and remaining dimensions on the order of those described above.

A further object is to provide a cuvette assembly which need not be mounted permanently, but is easily and accurately assembled and readily disassembled for cleaning and replacement.

Another object is to provide an assembly which requires no bottom drain with the accompanying connections and possibility of leakage and corrosion.

An additional object is to eliminate the risk of overfilling the cuvette.

Another object is to provide an assembly having means for simple mechanical control of the cuvette filling and draining operations.

These and other objects, advantages and functions of the invention will be apparent upon reference to the specification and to the accompanying drawings representing a preferred embodiment of the invention, in which like parts are identified by like reference symbols in each of the views, and in which.

Figure 1:
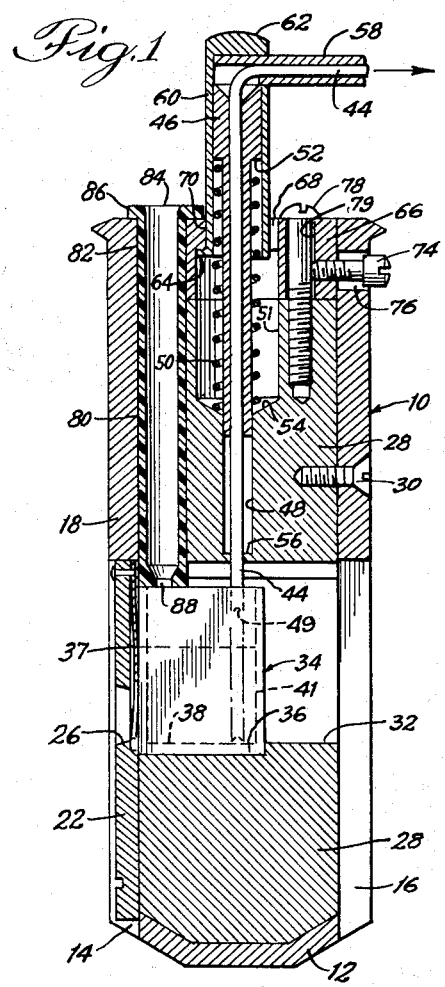
FIGURE 1 is a vertical axial sectional view of the cuvette assembly, taken on line 1—1 of FIGURE 3.

It has now been discovered in accordance with the invention, that a flat-bottomed ultra-micro cuvette may be successfully employed for making determinations with very small sample volumes, by employing a top-mounted drain for the cuvette, and providing particular means which furnish complete draining thereof. The new ultra-micro cuvette assembly includes a flat-bottomed cuvette, a top-mounted suction tube for draining the cuvette, and horizontal orifice means at the lower end of the tube. Exceptional accuracy is achieved, and the construction enables ready assembly and disassembly of the equipment. The construction is also very advantageous in enabling the use of conventional spectrophotometers and the like, without need for additional special instruments in order to make ultra-micro determinations.

Referring to the drawings, the cuvette assembly includes a tubular cuvette container or adapter 10 closed at one end by a bottom wall 12. The container fits in the cuvette well of a spectrophotometer or the like. Opposed parallel longitudinal slots 14 and 16 are provided in the lower half of the circular vertical container side wall 18. One slot 14 is dovetailed, to provide opposite vertical inwardly widening side walls 20. A rectangular mask 22 having inwardly and outwardly beveled vertical sides 24 is removably slidably inserted in the dovetail slot 20. The mask is inserted and removed from the base of the container, and it remains in the position illustrated when the equipment is used for making measurements. A central rectangular aperture 26 is provided in the mask, for passing an optical beam therethrough.

A filler plug or holder 28 is mounted within the container, and it is secured in fixed position therein by means of a screw 30 extending through the container wall 18 and into the plug. The filler plug serves for mounting the remaining structure. A horizontal transverse generally rectangular opening or slot 32 is provided in the filler plug, which extends from one container slot 14 to the opposite slot 16 and registers with the mask aperture 26 for passing an optical beam through the filler plug opening and through the container slot 16 opposite to the mask 22.

The filler plug is constructed for securing an ultra-micro cuvette 34 in the plug opening, and a rectangular recess 36 is provided at the base of the plug opening and adjacent the mask for this purpose. The cuvette is held in position by the mask 22, and when the mask is removed, the cuvette may be withdrawn from the container through the dovetail slot 14. A forked leaf spring 37 is secured on the inner surface of the mask 22. The spring bears against the cuvette to secure it in position, and the spring straddles the aperture 26 to avoid marring the cuvette in this area.

The cuvette 34 is constructed of transparent material such as glass, and it includes a horizontal flat or plane inside bottom 38 and plane-parallel vertical lower inner sides 40 and ends 41. The cuvette includes a pair of opposed upwardly widening or outwardly inclined top inner side walls 42, which serve purposes to be described. The internal width of the cuvette is slightly greater than the width of the mask aperture 26. The aperture extends from slightly above the bottom 38 of the cuvette to a horizontal plane which intersects the lower vertical sides 40 of the cuvette. A sample is placed in the cuvette, and a restricted optical beam corresponding to the size of the mask aperture 26 is passed through the cuvette and the sample therein.

Figure 2:
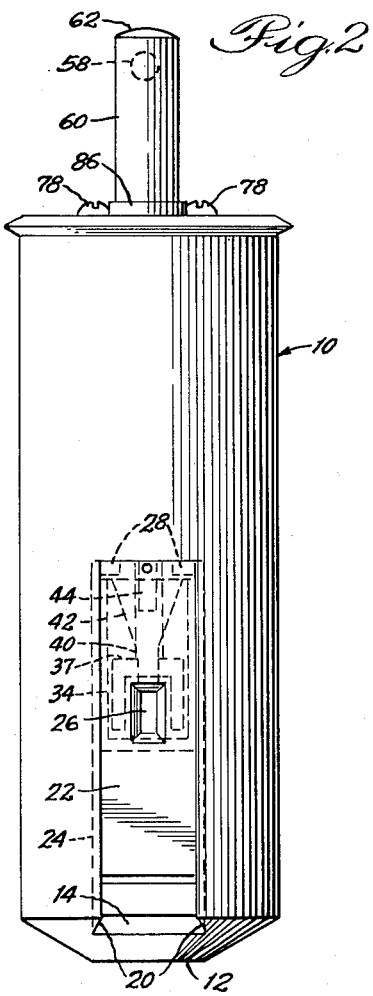
FIGURE 2 is a front elevational view of the assembly, taken in a direction normal to the view of FIGURE 1.

A top-mounted suction tube 44 is secured in a tubular guide 46 and mounted on the filler plug 28. The guide is mounted for sliding reciprocation in a central vertical cylindrical guideway or opening 48 above the horizontal opening 32 in the filler plug. The suction tube is vertically axially reciprocable within the container 10, between the inside bottom 38 of the cuvette 34, as illustrated in phantom lines in FIGURE 1, and a raised position in the cuvette between the inclined top walls 42, as illustrated in full lines in FIGURE 1, and in FIGURE 2. The lower operating end of the suction tube is constructed with recessed portions or nicks 49 which provide horizontal orifice means. The orifice means cooperate very importantly in completely draining the cuvette, as described subsequently.

Resilient means in the form of a coil compression spring 50 are mounted around the tube guide 46, in an enlarged upper vertical bore 51 in the filler plug. The spring bears on an external shoulder 52 on the guide at one end of the spring. The spring normally biases the suction tube to the raised position. When the spring is compressed, the tube guide 46 descends as far as the lower end 56 of the vertical filler plug guideway 48, at which time the suction tube is seated on the base of the cuvette.

The suction tube extends outwardly from the guide 46, and is enclosed in a tubulator member 58. The tubulator is connected to a suction or subatmospheric pressure source, with an interposed liquid trap. When the equipment is operating, suction is constantly exerted on the suction tube.

The upper ends of the tube guide 46 and the suction tube are enclosed by a tubular sleeve 60 having a push-button top 62. The suction tube spring 50 is seated in a channel formed between the sleeve and the tube guide 46. The guide shoulder 52 forms the base of the channel. An outwardly extending lug 64 is provided at the lower end of the sleeve 60, for removably holding the suction tube assembly in the filler plug 28 and the container 10.

Figure 3:
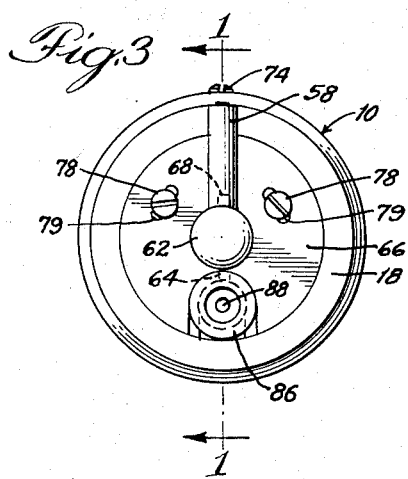
FIGURE 3 is a top plan view of the assembly.

A top rotatable locating plug 66 is mounted on the filler plug 28 in alignment therewith. It has a vertical circular opening 70 in which the sleeve 60 slidably reciprocates. The opening is coaxial with the enlarged bore 51 in the filler plug, which accommodates the sleeve lug 64 in its travel, and with the guideway 48. The locating plug is provided with a vertical release slot or recess 68 (FIGURE 3) along the opening 70 permitting the removal of the sleeve lug by turning the sleeve 60, for removing the suction tube assembly.

A laterally extending key 74 is in adjustable threaded engagement in the side of the rotatable plug 66, and it extends through a horizontal slot 76 in the upper end of the container wall 18. The key mates with a keyway, not shown, in the cuvette well of a spectrophotometer, to provide positive orientation of the assembly. The container 10, the filler plug 28, and the mask 22 and the cuvette 34 therewith are rotatably adjusted to center the mask aperture 26 on the optical beam by turning the container while the rotatable plug 66 is held by means of the key 74. The rotatable plug and the key may be turned relative to the container through a limited arc equal to the extent of the horizontal slot 76. When the adjustment is complete, the members are secured against relative rotation by tightening top screws 78 which extend through arcuate slots 79 in the rotatable plug 66 and are threaded into the filler plug 28.

The filler plug 28 defines with the container wall 18 a vertical opening 80 for admitting a pipette into the cuvette 34 from above. The locating plug 66 defines a registering opening 82. By these means, a pipette may be inserted to the bottom 38 of the cuvette in a filling operation, to avoid bubble entrainment. In a preferred construction, a non-wettable fill tube or sleeve 84 is removably inserted in the vertical openings 80 and 82, and it extends to the rim of the cuvette 34. It includes an outwardly extending peripheral top lip 86 for seating the tube on the container wall 18 and the locating plug 66. The bottom of the tube wall is inwardly enlarged to define a restricted central opening 88 for centering the pipette between the cuvette sides 40. The tube 84 is constructed of polyethylene or other suitable material, so that any liquid released by the pipette on the side wall will flow into the cuvette. Alternatively, the walls of the openings 80 and 82 may be covered with a hydrophobic film, such as a silicone film.

When the sample is introduced into the cuvette, the continuous suction applied to the suction tube 44 removes any excess liquid and prevents overfilling. When it is desired to drain the sample from the cuvette, pressure is exerted on the push-button top 62 to lower the suction tube to the bottom. At this time, owing to the unique construction including the recessed portions 49 which provide horizontal orifice means at the lower end of the suction tube, over 99.5% of the cuvette contents is drained within five seconds. The remainder is negligible for the usual determinations.

The surface tension of the liquid meniscus in the corners between the sides and bottom of the cuvette interferes with complete draining. When a suction tube is introduced into the liquid, the reduction in absolute pressure due to the Bernoulli effect at the vertical suction orifice causes vertical channeling, so that liquid remains in the corners. By providing the recessed portions 49 at the lower end of the suction tube 44, or nicking the bottom edge of the tube, the tube may be lowered to the bottom of the cuvette, and horizontal orifice means are provided by the recessed portions. With the suction restricted to the horizontal direction, the outflow is parallel to the flat bottom of the cuvette. The flow extends horizontally to the walls of the cuvette, overcoming the surface tension of the liquid meniscus in the corners, and they are drained. As fast as the corners are drained, liquid is caused by surface tension to flow to the depleted regions until the cuvette is empty. The lower end of the suction tube preferably is inserted into the cuvette adjacent to the corners at one end in the manner illustrated, for most rapid draining.

When the suction tube 44 is in the raised position and is being operated continuously, the cuvette would be drained far below the end of the suction tube if it were in a corner of a conventional cuvette, due to the effects described above. This danger is eliminated in the present construction by providing upwardly widening inside walls 42 between which the raised tube end is located. The widened walls also provide an entry guide for the tip of the transfer pipette used to fill the cuvette, and they further furnish an additional reservoir to contain any temporary rapid overfill.

In operation, the cuvette assembly is placed in the cuvette well of a spectrophotometer and oriented. Before filling with a sample, and occasionally between successive samples, a detergent solution is introduced into the cuvette for cleaning it. With suction applied to the suction tube 44, the push-button top 62 is depressed fully for about five seconds. A distilled water rinse is introduced and drained in the same manner. The cuvette is finally washed with a 1% solution of caprylic alcohol in acetone followed by a distilled water rinse.

A reference or blank is introduced, and the instrument is set to the reference reading, for example, 100% transmittance. On draining the reference, the galvanometer will indicate a new reading which corresponds to the empty cuvette. This is noted as an indication of completion of the drain period. A sample is then introduced, by means of a slender pipette inserted through the fill tube 84 to the inside bottom 38 of the cuvette. Readings are made and the sample is drained from the cuvette in the same manner as for the reference. A series of samples may be read successively in the cuvette.

If draining becomes incomplete after a series of determinations, the washing procedure is repeated. Should protein or other deposits build up on the cuvette walls, it may be removed and cleaned very rapidly. The suction tube 44 is removed from within the cuvette by turning the sleeve 60 until the lug 64 will pass through the release slot 68 in the rotatable plug, at which time the tube assembly may be raised from the container. The mask 22 is removed by sliding it out of the dovetail slot 14 from the bottom of the container. Then, the cuvette 34 may be removed from its recess for washing or replacement. The cuvette may be immersed in cleaning solution or solvents, particularly since no mask or cemented connections are attached thereto. The suction tube 44 and other parts may be cleaned if necessary. The parts are then easily and accurately reassembled.

It will be apparent that various changes and modifications may be made in the construction and arrangement of the components within the spirit and scope of the invention. It is intended that such changes and modifications be included within the scope of the appended claims.

The invention thus provides a very accurate and convenient cuvette assembly. It is unnecessary to provide a bottom drain hole and drain connections, which interfere with disassembly and present other problems. The basic plane-parallel sided type of cuvette is employed, and the required sample volume is kept to the minimum. There is no interference with the internal reflection of the optical beam from the cuvette which is desirable for the greatest optical efficiency. The apparatus may be rapidly and accurately oriented in standard spectrophotometers.

What I claim as new, and desire to secure by Letters Patent of the United States, is:

1. In an ultra-micro cuvette assembly for spectrophotometers and the like, the improvement which comprises a plane-parallel sided flat-bottomed cuvette, a container for removably holding said cuvette, and apertured mask removably mountable on said container, a top-mounted suction tube removably mountable in said container and vertically reciprocable between the inside bottom of said cuvette and a raised position above the bottom, and horizontal orifice means at the lower end of said tube, whereby when the suction tube is lowered to the bottom of the cuvette, the surface tension of the liquid meniscus in the corners is overcome and the cuvette will be drained.

2. In an ultra-micro cuvette assembly for spectrophotometers and the like, the improvement which comprises a flat-bottomed cuvette, a container for said cuvette, a holder mountable in said container to secure said cuvette, a top-mounted suction tube mountable on said holder and vertically reciprocable between the inside bottom of said cuvette and a raised position in the cuvette above the bottom, horizontal orifice means at the lower end of said tube, and means admitting a pipette into said container and into said cuvette from above, whereby when the suction tube is lowered to the bottom of the cuvette, the surface tension of the liquid meniscus in the corners is overcome and the cuvette will be drained.

3. A cuvette assembly as defined in claim 2 wherein said horizontal orifice means comprises a nick in the bottom edge of said tube.

4. A cuvette assembly as defined in claim 2 wherein said cuvette includes a pair of opposed upwardly widening top inside walls.

5. A cuvette assembly as defined in claim 2 including resilient means normally biasing said suction tube to said raised position, and push-button means for lowering said suction tube to said cuvette bottom.

6. An ultra-micro cuvette assembly for spectrophotometers and the like which comprises a flat-bottomed cuvette, a vertically arranged tubular container for said cuvette, a filler plug mountable in said container to secure said cuvette, means forming a horizontal opening through said plug for passing an optical beam therethrough, said cuvette being arranged in said plug opening in the path of said beam, means forming horizontal openings through said container for passing said beam therethrough and registering with said plug opening, locating means rotatable relative to said container for arranging said openings in the path of said beam, a top-mounted suction tube mountable on said plug and vertically reciprocable between the inside bottom of said cuvette and a raised position in the cuvette above the bottom, and recessed portions providing horizontal orifice means at the lower end of said suction tube.

7. A cuvette assembly as defined in claim 6 including a mask removably mountable in said container opening, said cuvette being removable through said container opening upon removing said mask.

8. An ultra-micro cuvette assembly for spectrophotometers and the like which comprises a vertically arranged tubular container, means forming a slot in one side and a registering opening in the opposite side of said container for passing a horizontal optical beam therethrough, a mask removably mountable in said slot, a filler plug mountable in said container, means forming a horizontal opening through said plug for passing said beam therethrough, a plane-parallel sided flat-bottomed cuvette mountable in said plug opening in the path of said beam, including a pair of opposed upwardly widening top inside walls, said mask retaining said cuvette within said plug opening and said cuvette being removable through said slot upon removing said mask, a top-mounted suction tube removably mountable on said plug and vertically reciprocable between the inside bottom of said cuvette and a raised position in the cuvette between said top walls, recessed portions providing horizontal orifice means at the lower end of said suction tube, resilient means mountable on said plug and normally biasing said suction tube to said raised position, push-button means for lowering said suction tube to said cuvette bottom and means forming a vertical opening in said container for admitting a pipette into said cuvette from above.

9. A cuvette assembly as defined in claim 8 including a fill tube mountable in said vertical opening in said container.

10. A cuvette assembly as defined in claim 8 including a locating plug mountable on said filler plug, a locating key connected to said locating plug, said locating plug and key being rotatable together relative to said filler plug and said container, and means for securing said relatively rotatable members against relative rotation.

References Cited in the file of this patent
UNITED STATES PATENTS

| | | |
|---|---|---|
| 2,483,876 | Boyer | Oct. 4, 1949 |
| 2,907,641 | Notebrook | Oct. 6, 1959 |

FOREIGN PATENTS

| | | |
|---|---|---|
| 466,096 | Canada | June 27, 1950 |